(12) United States Patent  
Coventry

(10) Patent No.: US 6,732,918 B2  
(45) Date of Patent: May 11, 2004

(54) SELF SERVICE TERMINAL

(75) Inventor: Lynne M. Coventry, Edinburgh (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/008,559

(22) Filed: Nov. 13, 2001

(65) Prior Publication Data

US 2002/0060241 A1 May 23, 2002

(30) Foreign Application Priority Data

Nov. 22, 2000 (GB) .............................................. 0028472

(51) Int. Cl.⁷ .............................................. G06F 17/60
(52) U.S. Cl. ......................................... 235/379; 902/14
(58) Field of Search ................................ 235/379, 380, 235/382; 902/13, 14, 5

(56) References Cited

U.S. PATENT DOCUMENTS

| | | | | |
|---|---|---|---|---|
| 4,593,183 A | * | 6/1986 | Fukatsu | 235/379 |
| 4,761,542 A | * | 8/1988 | Kubo et al. | 235/379 |
| 5,185,515 A | | 2/1993 | Nishibe | |
| 5,412,189 A | * | 5/1995 | Cragun | 235/379 |
| 5,589,855 A | * | 12/1996 | Blumstein et al. | 345/173 |
| 6,061,666 A | * | 5/2000 | Do et al. | 235/379 |
| 6,327,575 B1 | * | 12/2001 | Katz | 705/16 |
| 6,464,135 B1 | * | 10/2002 | Cohen et al. | 235/379 |

FOREIGN PATENT DOCUMENTS

| | | | |
|---|---|---|---|
| EP | 0720131 | 7/1996 | |
| EP | 0887778 | 12/1998 | |
| JP | 361150065 | * 7/1986 | ........... G06F/15/30 |
| JP | 9106319 | 4/1997 | |
| WO | 9827533 | 6/1998 | |

OTHER PUBLICATIONS

Translation of Japanese Patent 61–150065.*

* cited by examiner

Primary Examiner—Daniel St. Cyr  
(74) Attorney, Agent, or Firm—Michael Chan

(57) ABSTRACT

A self-service terminal (14) is described that has an improved user interface (34), particularly suitable for visually impaired users. The user interface comprises a plurality of user interface elements (38,40,42,44,46), a navigation area (50), and a plurality of tactile guides (52). Each guide (52) extends from the navigation area (50) to one of the user interface elements (38,40,42,44,46), so that a user can locate a user interface element using one of the tactile guides (52). A vibration mechanism (54) is also provided so that each of the guides (52) can be selectively vibrated, so that when a user interface element is to be used, a guide (52) extending from the user interface element to the navigation area (50) is vibrated by the vibration mechanism (54).

6 Claims, 2 Drawing Sheets

SELF SERVICE TERMINAL

BACKGROUND OF THE INVENTION

The present invention relates to a self-service terminal. In particular, the invention relates to a self-service terminal, such as an automated teller machine (ATM), having an improved user interface.

User interfaces on self-service terminals such as ATMs are designed to allow users to enter complex transactions in a simple manner. However users who are visually impaired have difficulty using ATMs because it is difficult for them to determine which user interface element (for example, the keypad, card reader, printer slot, and such like) is being used and where that element is located on the user interface. As more functionality is added to ATMs, the physical space occupied by the user interface increases; this makes it even more difficult for visually impaired users to locate a particular user interface element to interact with.

SUMMARY OF THE INVENTION

According to a first aspect of the present invention there is provided a self-service terminal having a user interface comprising a plurality of user interface elements, characterized in that the user interface includes a navigation area and a plurality of tactile guides, each guide extending from the navigation area to one of the user interface elements, so that a user can locate a user interface element using a tactile guide.

Preferably, the terminal includes a vibration mechanism operable to vibrate a selected guide, so that when a user interface element is to be used, a guide extending from the user interface element to the navigation area is vibrated by the vibration mechanism.

The vibration mechanism may vibrate the entire length of the tactile guide, or only a portion of the length of the guide. For example only a portion near to the navigation area or near to the user interface element may be vibrated.

The word "vibrate" is used herein to denote any repetitive physical movement that can be detected by human touch.

Each guide may have an associated tactile marker indicating the user interface element to which the guide extends.

The guide may be a narrow ridge in the form of a line. Each guide may extend in a continuous line or a broken line.

By virtue of this aspect of the invention a self-service terminal is provided that guides a user through a transaction by selectively vibrating a guide associated with a user interface element that the user has to interact with. This enables a visually impaired user to locate the entry or exit point on the user interface that he/she has to use.

The navigation area may be located near to the center of the user interface so that a visually impaired user can easily locate the navigation area, even on a terminal that the user is not familiar with.

Preferably, the navigation area includes a raised formation that serves as the starting point for navigation.

The SST may be an ATM.

According to second aspect of the present invention there is provided a method of leading a user through a transaction at a self-service terminal having a user interface comprising a plurality of user interface elements, where the transaction involves using the elements in a predetermined sequence, characterized by the steps of:

(i.) identifying which user interface element the user has to interact with to conform to the predetermined sequence;

(ii.) identifying a tactile guide extending from a navigation area to the identified user interface element;

(iii.) vibrating the identified tactile guide to assist a user in locating the user interface element;

(iv.) detecting when the user has completed an interaction at the user interface element;

(v.) repeating steps (i.) to (iv.) until the transaction has been completed.

By virtue of this aspect of the present invention, an SST is provided that guides the user through a transaction by vibrating a tactile guide associated with the next user interface element to be interacted with, thus a visually impaired user can easily locate the next user interface element to be used by running his/her fingers along the vibrating guide.

According to a third aspect of the present invention there is provided an SST system comprising a host interconnected by a network to a plurality of SSTs according to the first aspect of the invention.

BRIEF DESCRIPTION OF THE DRAWINGS

These and other aspects of the present invention will be apparent from following specific description, given by way of example, with reference to the accompanying drawings, in which.

DETAILED DESCRIPTION

Figure 1:
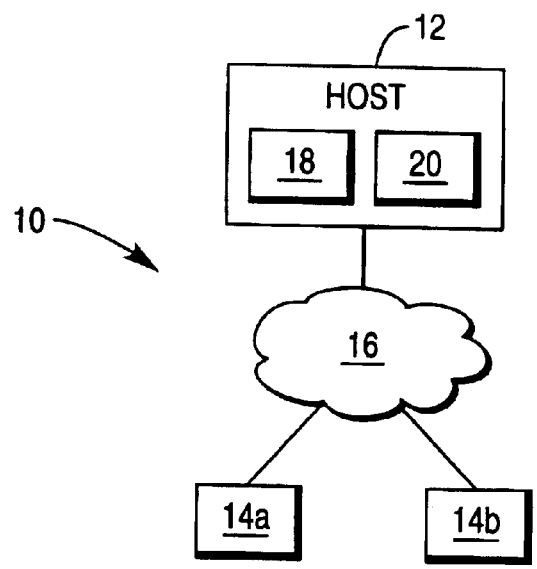
FIG. 1 is a block diagram of an SST system according to one embodiment of the present invention.

Reference is now made to FIG. 1, which is a block diagram of a self-service terminal system 10 in accordance with one embodiment of the present invention. The system 10 is owned and operated by a financial institution and comprises a conventional host 12 interconnected to a plurality of SSTs 14 (only two are shown as 14a and 14b) by a secure network 16. The SSTs 14 are ATMs. As is well known in the art, the host 12 includes an authorization facility 18 for authorizing transactions received from the ATMs, and a back-office facility 20.

The back-office facility 20 includes details of bank accounts held by customers of the financial institution and stores information relating to transactions executed at the ATMs 14. The host 12 and ATMs 14 are physically remote from each other, but are shown in proximity in FIG. 1 for clarity.

Figure 2:
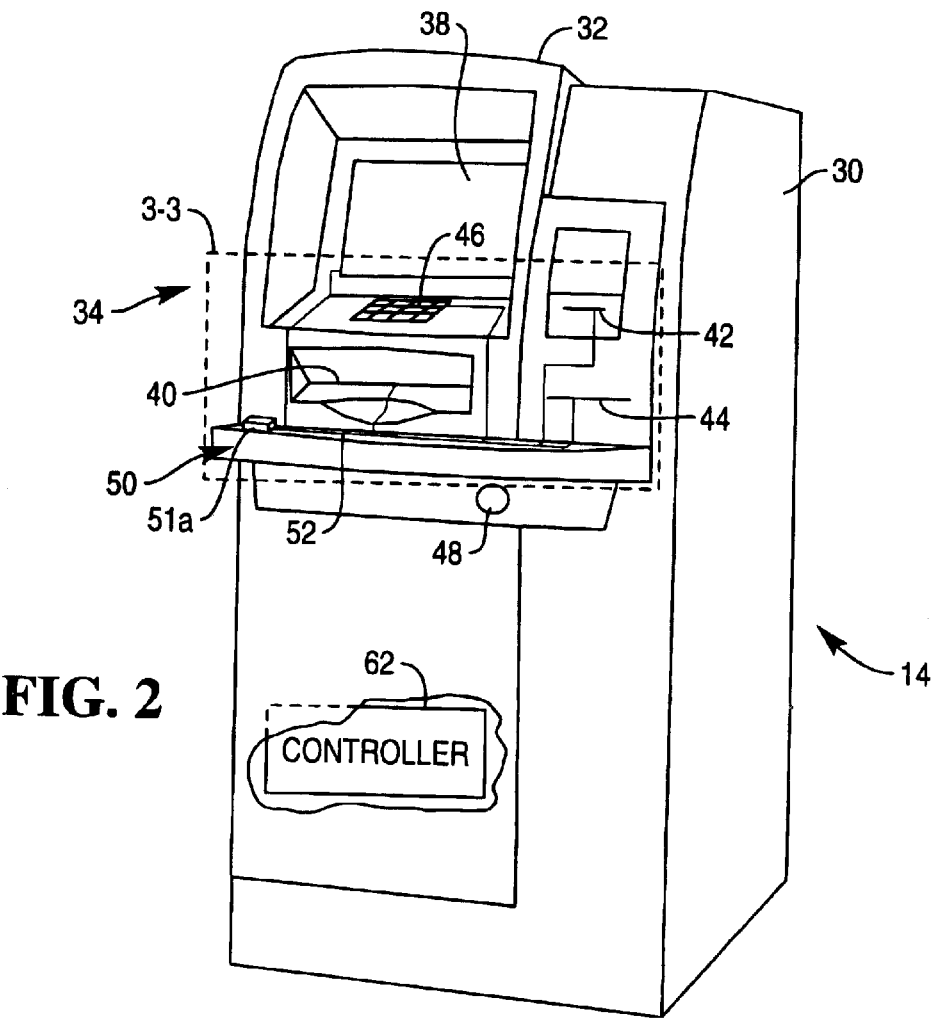
FIG. 2 is a schematic diagram of one of the terminals of the system of FIG. 1.

Referring now to FIG. 2, which shows a perspective view of one of the ATMs 14, the ATM 14 comprises a chassis (not shown) for supporting exterior panels 30, internal ATM modules (not shown), and a fascia 32.

The fascia 32 incorporates a user interface 34 and defines a plurality of slots so that when the fascia 32 engages fully with the chassis and panels 30 the slots align with user interface elements located within the ATM 14.

The user interface 34 comprises a display 38, a cash dispense slot 40, a card entry/exit slot 42 (hereinafter referred to as a card entry slot), a receipt slot 44, and an encrypting keypad 46.

The fascia 32 has a lock mechanism 48 for securing the fascia 32 to and for releasing the fascia 32 from the chassis and panels 30.

The user interface 34 also includes a navigation area 50 and a plurality of tactile guides 52 (best seen in FIG. 3) extending from the navigation area 50.

Figure 3:
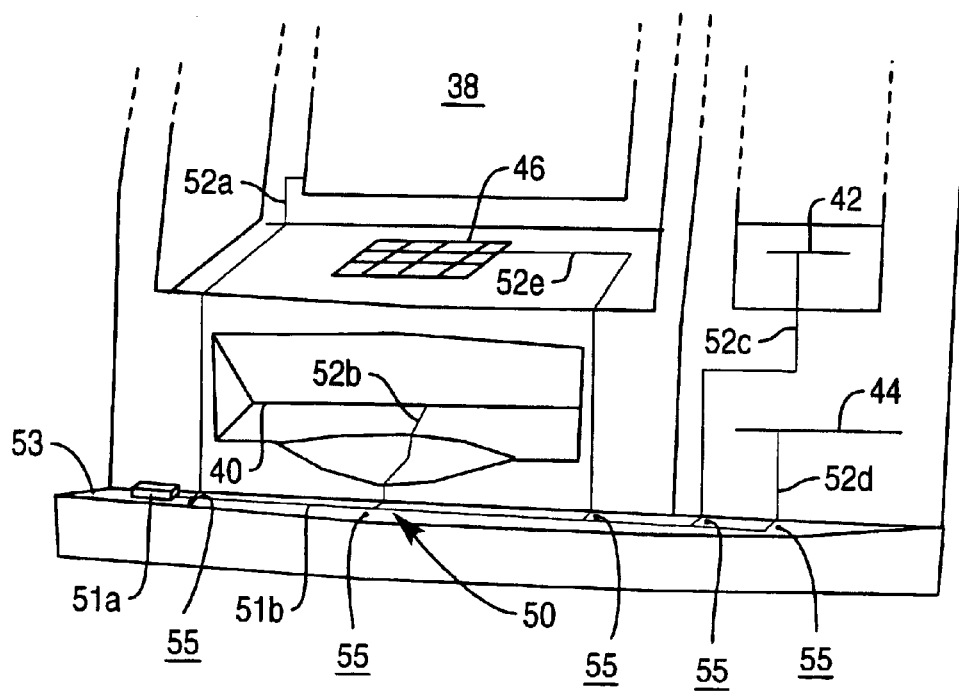
FIG. 3 is a schematic diagram of part of the terminal of FIG. 2, showing the user interface in more detail.

Reference is now made to FIG. 3, which shows in more detail the part of the user interface 34 surrounded by the broken line (labeled 3-3) in FIG. 2.

The navigation area 50 has a raised textured surface 51a that serves as a starting point for user navigation of the interface 34, and a common portion 51b extending from the starting point 51a along a shelf 53 defined by the fascia 32. Each guide 52 extends from the navigation area 50 to a user interface element. Each guide 52 branches from this common portion 51b to a user interface element. As all of the guides 52 branch from this common portion 51b, a user can move his/her finger along the common portion 51b to locate the correct guide 52, as will be described in more detail below. As shown schematically in FIG. 3, each guide 52 has an associated tactile marker 55 located on the shelf 53 and adjacent the common portion 51b at the point at which that guide branches from the common portion 51b.

Thus, display guide 52a extends from the navigation area 50 to the display 38; the cash dispense guide 52b extends from the navigation area 50 to the cash dispense slot 40; the card slot guide 52c extends from the navigation area 50 to the card entry slot 42; the print slot guide 52d extends from the navigation area 50 to the receipt printer slot 44; and the keypad guide 52e extends from the navigation area 50 to the keypad 46. This guide arrangement links each user interface element 38,40,42,44,46 to the navigation area 50.

Figure 4:
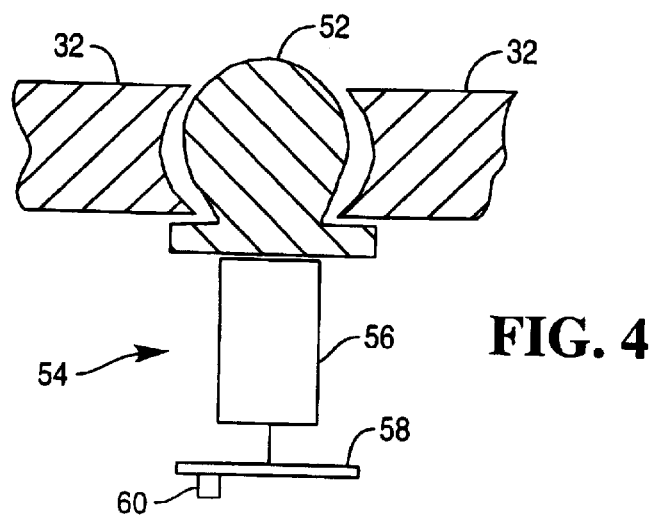
FIG. 4 is a cross sectional view of part of the terminal of FIG. 2, showing a tactile guide in more detail.

Reference is now made to FIG. 4, which is a cross sectional view of part of the fascia 32 illustrating a guide 52 and an associated vibration mechanism 54. The guide 52 is a continuous length of plastics material located in a recess on the fascia 32, so that the material protrudes from the recess as a ridge having a textured surface. The guides 52 are the same color as the fascia 32 to ensure that they do not mar the aesthetics of the ATM 14.

Each guide 52 is coupled to a respective vibration mechanism 54 near the point at which the guide branches from the common portion 51b. Each vibration mechanism 54 comprises a small DC motor 56 driving a gear 58 having a weight 60 mounted off-center on the gear 58. As the gear 58 is rotated, the weight causes the motor 56 and gear 58 to vibrate. This is a conventional vibration mechanism that is used in, for example, cellular telephones and toys.

Each motor 56 is coupled to an ATM controller 62 shown schematically in FIG. 2 that controls the application flow of the ATM 14. In use, the controller 62 identifies which user interface element a user has to interact with to proceed with a transaction; for example, to initiate a transaction the user must enter his/her card into the card entry slot 42.

The controller 62 then determines which guide 52 is associated with the element that is to be interacted with. For example, guide 52c is associated with card entry slot 42.

The controller 62 then energizes when the motor 56 associated with the guide for that element (for example, guide 52c) to vibrate that guide 52.

The controller 62 then detects when the user has completed an interaction with that element; for example, when the user has entered his/her card. The controller 62 does this by receiving a message from the user interface element or an element associated with the user interface element (such as a card reader (not shown)). When an interaction with a user interface element has been completed, the controller 62 de-activate the motor 56 associated with the guide for that element, so that the guide ceases vibrating.

The controller 62 repeats this process until a transaction has been completed.

It will now be appreciated that this embodiment of the present invention has the advantage that a visually impaired user is guided through a transaction by vibrating a leader line (guide) associated with a user interface element to be used.

Various modifications may be made to the above described embodiment within the scope of the invention, for example, in other embodiments the tactile guides may have a different shape, or may form a broken line or pattern rather than a continuous line. In other embodiments, the terminal may be a non-cash kiosk. In other embodiments, the tactile guides may be in the form of hollow tubes having fluid therein, whereby the fluid is pulsed (moved within the tube) to cause the tube to vibrate. In the above embodiment, each guide branches from a common straight portion; in other embodiments, each guide may be separate from the other guides so that there is no common portion. In other embodiments, the navigation area may be located on a different position to that shown; for example, the navigation area may be located in the vicinity of the keypad.

What is claimed is:

1. A self-service terminal for enabling a user to carry out a self-service transaction, the self-service terminal comprising:

a display device for interacting with the user;

a non-display device separate from the display device and for interacting with the user;

a fascia including (i) means defining a first opening adjacent to the display device and through which the user can interact with the display device, and (ii) means defining a second opening spaced apart from the first opening and adjacent to the non-display device and through which the user can interact with the non-display device;

means defining a common navigation area which is spaced apart from at least one of the devices;

a first tactile guide extending between the common navigation area and the first opening adjacent to the display device;

a second tactile guide spaced apart from the first tactile guide and extending between the common navigation area and the second opening adjacent to the non-display device;

a first actuatable vibrating mechanism for, when actuated, vibrating the first tactile guide to enable the user to easily locate the vibrating first tactile guide in the vicinity of the common navigation area and then to follow the vibrating first tactile guide to the first opening through which the user can interact with the display device;

a second actuatable vibrating mechanism for, when actuated, vibrating the second tactile guide to enable the user to easily locate the vibrating second tactile guide in the vicinity of the common navigation area and then to follow the vibrating second tactile guide to the second opening through which the user can interact with the non-display device; and a vibration control mechanism for (i) actuating the first tactile guide to vibrate when the transaction requires the user to interact with the display device, and (ii) actuating the second tactile guide to vibrate when the transaction requires the user to interact with the non-display device.

2. A self-service terminal for enabling a user to carry out a self-service transaction, the self-service terminal comprising:

a first user interface element other than a display device for interacting with the user;

a second user interface element other than a display device and separate from the first user interface element and for interacting with the user;

a fascia including (i) means defining a first opening adjacent to the first user interface element and through which the user can interact with the first user interface element, and (ii) means defining a second opening spaced apart from the first opening and adjacent to the second user interface element and through which the user can interact with the second user interface element;

means defining a common navigation area which is spaced apart from the first and second user interface elements;

a first tactile guide extending between the common navigation area and the first opening adjacent to the first user interface element;

a second tactile guide spaced apart from the first tactile guide and extending between the common navigation area and the second opening adjacent to the second user interface element;

a first actuatable vibrating mechanism for, when actuated, vibrating the first tactile guide to enable the user to easily locate the vibrating first tactile guide in the vicinity of the common navigation area and then to follow the vibrating first tactile guide to the first opening through which the user can interact with first user interface element;

a second actuatable vibrating mechanism for, when actuated, vibrating the second tactile guide to enable the user to easily locate the vibrating second tactile guide in the vicinity of the common navigation area and then to follow the vibrating second tactile guide to the second opening through which the user can interact with second user interface element; and a vibration control mechanism for (i) actuating the first tactile guide to vibrate when the transaction requires the user to interact with the first user interface element adjacent to the first opening to which the first tactile guide extends from the common navigation area, and (ii) actuating the second tactile guide to vibrate when the transaction requires the user to interact with the second user interface element adjacent to the second opening to which the second tactile guide extends from the common navigation area.

3. A self-service terminal for enabling a user to carry out a self-service transaction, the self-service terminal comprising:

a first user interface element other than a display device for interacting with the user;

a second user interface element other than a display device and separate from the first user interface element and for interacting with the user;

a fascia including (i) means defining a first location at which the first user interface element is located and at which the user can interact with the first user interface element, and (ii) means defining a second location spaced apart from the first location and at which the second user interface element is located and at which the user can interact with the second first user interface element;

means defining a common navigation area which is spaced apart from the first and second user interface elements;

a first tactile guide extending between the common navigation area and the first location at which the first user interface element is located;

a second tactile guide spaced apart from the first tactile guide and extending between the common navigation area and the second location at which the second user interface element is located;

a first actuatable vibrating mechanism for, when actuated, vibrating the first tactile guide to enable the user to easily locate the vibrating first tactile guide in the vicinity of the common navigation area and then to follow the vibrating first tactile guide to the first location at which the first user interface element is located so that the user can interact with first user interface element;

a second actuatable vibrating mechanism for, when actuated, vibrating the second tactile guide to enable the user to easily locate the vibrating second tactile guide in the vicinity of the common navigation area and then to follow the vibrating second tactile guide to the second location at which the second user interface element is located so that the user can interact with second user interface element; and a vibration control mechanism for (i) actuating the first tactile guide to vibrate as the second tactile guide remains substantially vibration free when the transaction requires the user to interact with the first user interface element, and (ii) actuating the second tactile guide to vibrate as the first tactile guide remains substantially vibration free when the transaction requires the user to interact with the second user interface element.

4. A self-service terminal according to claim 3, wherein the first vibration mechanism vibrates the entire length of the first tactile guide as the second tactile guide remains substantially vibration free when the transaction requires the user to interact with the first user interface element, and the second vibration mechanism vibrates the entire length of the second tactile guide as the first tactile guide remains substantially vibration free when the transaction requires the user to interact with the second user interface element.

5. An automated teller machine (ATM) for enabling an ATM customer to carry out an ATM transaction, the ATM comprising:

a first ATM customer interface element other than a touchscreen for interacting with the ATM customer;

a second ATM customer interface element other than a touchscreen and separate from the first ATM customer interface element and for interacting with the ATM customer;

a fascia including (i) means defining a first location at which the first ATM customer interface element is located and at which the ATM customer can interact with the first ATM customer interface element, and (ii) means defining a second location spaced apart from the first location and at which the second ATM customer interface element is located and at which the ATM customer can interact with the second ATM customer interface element;

means defining a common navigation area which is spaced apart from the first and second ATM customer interface elements;

a first tactile guide extending between the common navigation area and the first location at the first ATM customer interface element is located;

a second tactile guide spaced apart from the first tactile guide and extending between the common navigation area and the second location at which the second ATM customer interface element is located;

a first actuatable vibrating mechanism for, when actuated, vibrating the first tactile guide to enable the ATM customer to easily locate the vibrating first tactile guide in the vicinity of the common navigation area and then to follow the vibrating first tactile guide to the first location at which the first ATM customer interface element is located so that the ATM customer can interact with first ATM customer interface element;

a second actuatable vibrating mechanism for, when actuated, vibrating the second tactile guide to enable the ATM customer to easily locate the vibrating second tactile guide in the vicinity of the common navigation area and then to follow the vibrating second tactile guide to the second location at which the first ATM customer interface element is located so that the ATM customer can interact with second ATM customer interface element; and a vibration control mechanism for (i) actuating the first tactile guide to vibrate as the second tactile guide remains substantially vibration free when the ATM transaction requires the ATM customer to interact with the first ATM customer interface element, and (ii) actuating the second tactile guide to vibrate as the first tactile guide remains substantially vibration free when the ATM transaction requires the ATM customer to interact with the second ATM customer interface element.

6. An ATM according to claim 5, wherein the first vibration mechanism vibrates the entire length of the first tactile guide as the second tactile guide remains substantially vibration free when the ATM transaction requires the ATM customer to interact with the first ATM customer interface element, and the second vibration mechanism vibrates the entire length of the second tactile guide as the first tactile guide remains substantially vibration free when the ATM transaction requires the ATM customer to interact with the second ATM customer interface element.

* * * * *